March 11, 1952   B. J. VAN DER STIGCHEL   2,588,779
ELECTRIC PNEUMATIC DRIVING DEVICE FOR A MECHANISM
HAVING TO MAKE A RECIPROCATING MOVEMENT
OF LIMITED LENGTH AT ARBITRARY MOMENTS
Filed Jan. 28, 1947   5 Sheets-Sheet 1

Inventor:
Bastiaan Jan van der Stigchel

March 11, 1952  B. J. VAN DER STIGCHEL  2,588,779
ELECTRIC PNEUMATIC DRIVING DEVICE FOR A MECHANISM
HAVING TO MAKE A RECIPROCATING MOVEMENT
Filed Jan. 28, 1947      OF LIMITED LENGTH AT ARBITRARY MOMENTS
5 Sheets-Sheet 2

Inventor:
Bastiaan Jan van der Stigchel

FIG.7

March 11, 1952   B. J. VAN DER STIGCHEL   2,588,779
ELECTRIC PNEUMATIC DRIVING DEVICE FOR A MECHANISM
HAVING TO MAKE A RECIPROCATING MOVEMENT
Filed Jan. 28, 1947   OF LIMITED LENGTH AT ARBITRARY MOMENTS
5 Sheets-Sheet 4

Patented Mar. 11, 1952

2,588,779

UNITED STATES PATENT OFFICE 2,588,779

ELECTRIC PNEUMATIC DRIVING DEVICE FOR A MECHANISM HAVING TO MAKE A RECIPROCATING MOVEMENT OF LIMITED LENGTH AT ARBITRARY MOMENTS

Bastiaan Jan van der Stigchel, The Hague, Netherlands

Application January 28, 1947, Serial No. 724,808
In the Netherlands November 9, 1940

Section 1, Public Law 690, August 8, 1946
Patent expires November 9, 1960

12 Claims. (Cl. 60—51)

Owing to the high speed of the rotation of electric motors, driving by means of an electric motor generally demands the application of a retarding transmission between the electric motor and the driven mechanism.

Suchlike transmissions always present drawbacks, however, besides the resulting loss of power. Gear-transmissions are costly and inconvenient because of the noise they usually make. Pulleys and belts cause an unreliable operation. None of said transmissions is flexible, which may sometimes be desirable, or even necessary, when two elements have to be driven.

It has been found that when the driven mechanism does not demand a continuous rotation, but a reciprocating movement along a limited distance, excellent results are obtained with the combination of electric motors and a pneumatic, or fluid drive transmission.

The principle of this combination is that an electric motor drives an air-pump owing to which changes of pressure are caused in a reservoir with a movable wall, which wall is then connected mechanically to the apparatus to be moved.

As a reservoir with a movable wall a cylinder with a piston fitting into it or a pair of air bellows may be used.

As examples of application the movement of a stage-curtain, of a railroad-crossing-barrier, of a freight-elevator, of a gate-door, or of a bridge may be mentioned. As will be explained more fully below, the invention has found an excellent application in the so-called overhead-doors, being doors, for instance for garages, which are first allowed to tilt slightly rearwardly, till their top is entirely clear of their frame, after which the door is lifted in a curved line, till it is somewhat below and parallel to the ceiling.

The present invention exclusively employs a rotating air-pump, because its vanes or impeller can be mounted directly on the shaft of the electric motor, and consequently any transmission becomes superfluous. Furthermore, any valve becomes also superfluous, which also assures reliable operation and simplifies the operation.

Further economic advantages will be mentioned below.

As the reciprocating movement requires producing of alternate pressure above and below atmospheric-pressure in the air-reservoir, and since the rotating of a fan in reversed direction does not yield the reverse effect, it is necessary to provide said reservoir with two rotating air pumps, which are mounted in opposite directions with regard to the reservoir and therefore, working alternately produce either pressure above or below atmospheric pressure in the reservoir. The practical application thereof has the disadvantage, however, that each pump of said type when not rotating means an opening in the reservoir, so that the other pump will not be able to cause or to maintain therein either a pressure above or below atmospheric pressure. The application of valves can be of no use here, since a valve, in the non-rotating suction-pump would be pushed open by the rotating pressure-pump, whereas a valve in the non-moving pressure-pump would be sucked open by the rotating suction-pump. Hereby it would be necessary to use cocks which would very much complicate the operation.

The invention overcomes this difficulty by mounting the two pumps in opposite directions, and therefore working as pressure-pump and as suction-pump, behind each other in a common, which is fitting closely around them, and communicating on one side with the atmosphere and on the other side with the reservoir having a movable wall On rotating each pump then blows or sucks its air through the non-moving impeller of the other pump.

An important advantage of this arrangement is the flexibility of its operation; the expansible reservoir acts like an air-cushion, so that the electric motor can immediately be switched on at full force without giving, however, a jolt to the mechanism to be moved or even compelling it to start at once.

Without a suchlike pneumatic transmission of this type it would be necessary to start the electric motor slowly on account of the great mass to be moved. When in those cases the motor has to be started and stopped from more than one point, this involves an extensive and costly apparatus.

Since according to the invention the electric motor can run at full speed from the very first moment, a small electric motor, say a quarter of an H. P., will be sufficient for all the above-mentioned applications, so that motor and impeller units, such as they are made by many vacuum-cleaner-factories in large quantities, hence at low prices, may be used.

A further advantage of the possible application of suchlike small motors is that the above described fluid drive mechanism can be connected to the electric-light wiring, owing to which the cost of special wiring is eliminated again. Also the operation can be effected by means of the usual light-switches or, if desired by, special switches, if operation from several points is desired.

It is clear that the force exerted by the plant may be varied by the choice of the area of the piston or the bellows. The speed of the movement transmitted to the driven apparatus changes in an inverse ratio.

The piston or the movable portion of the bellows may be connected in different ways with the apparatus to be moved, for instance by means of rods or cables or suchlike means. In a direct connection of said two members the ways of driving and driven parts will be equal, but it is clear that therein some mechanic transmission, for instance a lever, a tackle, a stepped pulley and so on may be interposed by which the force and way may be varied.

A further advantage of the penumatic or fluid drive mechanim is that it permits very simply movements of various lengths to be executed wherever and whenever desired, by leading the compressed or rarified air to or from the desired places. When explaining below the movement of an overhead-door, an example will be given of the combination of a tilting movement over a short distance—by means of a pair of bellows—followed by a lifting movement over a longer distance by means of a cylinder with a piston.

In the above-mentioned apparatus pressure either above or below atmospheric pressure is alternately caused on one side of the piston only, the other side being constantly influenced by the atmospheric pressure. On pressing, said atmospheric pressure hence presents a resistance of one atmosphere, on sucking the force on the piston can never exceed one atmosphere, which may be too low for some cases. This condition can be improved considerably, and the second piston-surface can be made more productive by disposing on either side of the movable wall of the air-reservoir a casing in which two rotating pumps are mounted and therefore working in an opposite direction.

If this principle is applied to a cylinder with a piston, the cylinder is consequently closed on both sides—except for the passage of the members having to transmit the movement of the piston—each of the cylinder chambers before and behind the piston being connected to housing with two pumps.

If the movements are small, so that a pair of bellows is sufficient two pair of bellows are connected to each other, the end walls then being fixed and the common central wall moving to and fro.

The invention will be explained more fully by the figures of the accompanying drawings.

Figure 1:
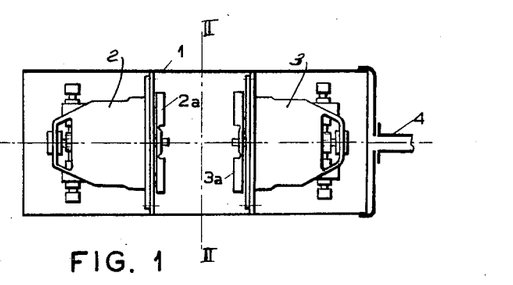
Figure 1 shows a vertical section through a housing in which the two rotating air-pumps are directly mounted on the shafts of electric motors.
Figure 2:
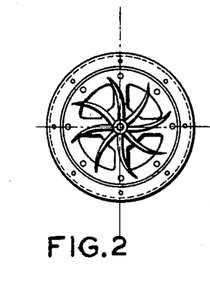
Figure 2 shows a vertical section along the line II—II of Figure 1.

Figure 1 shows the housing 1, in which the electric motors 2 and 3 are mounted, which make the impellers $2^a$ and $3^a$ turn in opposite directions. To the left the housing is open, to the right a conduit 4 leads to the air-reservoir with the movable wall.

Figure 3:
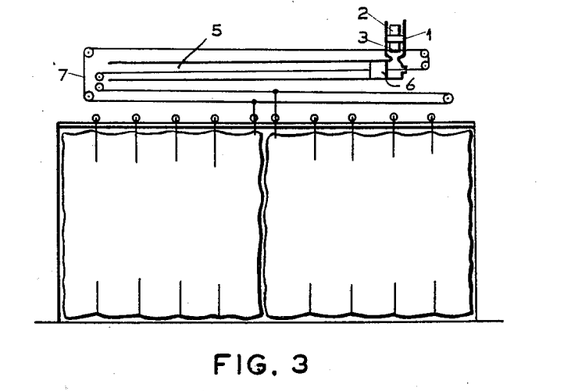
Figure 3 is a schematic view of a preferred embodiment employing only one pair of air pumps.

Figure 3 shows the air-reservoir 5, and the piston 6, which by an endless cable 7 is connected to the stage-curtain for opening and closing the same.

Figure 4:
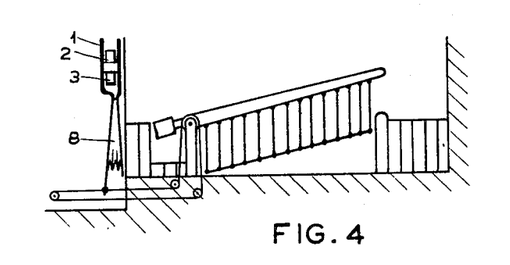
Figure 4 is a schematic view of another embodiment employing bellows.

In Figure 4 the air-reservoir, in this embodiment bellows, 8 acts to lift a railroad crossing barrier.

Figures 5, 6:
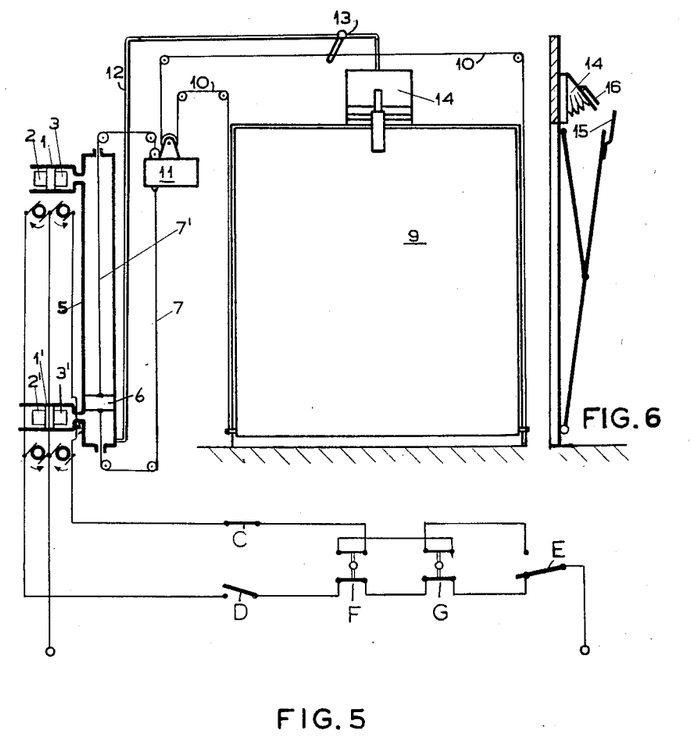
Figure 5 is a schematic view of an overhead door actuated by two pairs of air pumps.
Figure 6 is a side-elevation of the bellows shown in Fig. 5.

In Figure 5 the rigid overhead-door is indicated by 9, suspended on the cable 10 and balanced by the counter-weight 11. To the latter are also connected the ends of the cables 7 and 7', the other ends of which are secured to the piston 6. The latter moves in the cylinder 5, one end of which is connected to the housing 1 with the pumps 2, and 3, and the other end to the housing 1' with the pumps 2' and 3'. Furthermore an air-conduit 12 in which there is a cock 13, leads from there to the bellows 14.

This mechanism works as follows:

To open the door the pressure-pump on the bottom and the suction-pump on the top of the cylinder are started, owing to which compressed air flows through the conduit 12 to the bellows 14, being at the inside on the garage or suchlike closed space, so that by the expansion of the bellows the door tilts slightly inward, till it is outside its frame. After that the cock 13 is closed by the movement of the door or the cable. In the meantime the piston 6 has also commenced its upward-movement, owing to which the counter-weight has descended, and the door 9 has risen, which door is now brought into an almost horizontal position below the ceiling by means of some guiding-member, for instance a system of rods, as shown in Figure 6, and/or by means of rails disposed beside the frame and below the ceiling.

To close the door, the pressure-motor is started in the top and the suction-motor in the bottom of the cylinder, owing to which the counter-weight rises and the door descends. Finally a cam 15 (Figure 6) fixed onto the door falls into a fork 16 fixed to the bellows, after which an actuating member (not shown) fixed to the door or the cable opens the cock 13 and the negative pressure from the bottom-part of the cylinder causes contracting of the bellows, and at the same time draw the door into its frame.

Figure 5 shows the electric switching-device, it being assumed that it must be possible to operate the plant from three points, which number can be extended, however, to any desired number. On those points there are successively the switch E and the double switches G, F etc. Further C is the door-end-switch, closing when the door descends, and being opened when the open door has reached its end-position, whereas D is the door-end-switch closing, when the door ascends and being opened when the door arrives in the closed position.

Actuation of one of the switches causes the desired movement of the door, upwards or downwards.

Figure 7:
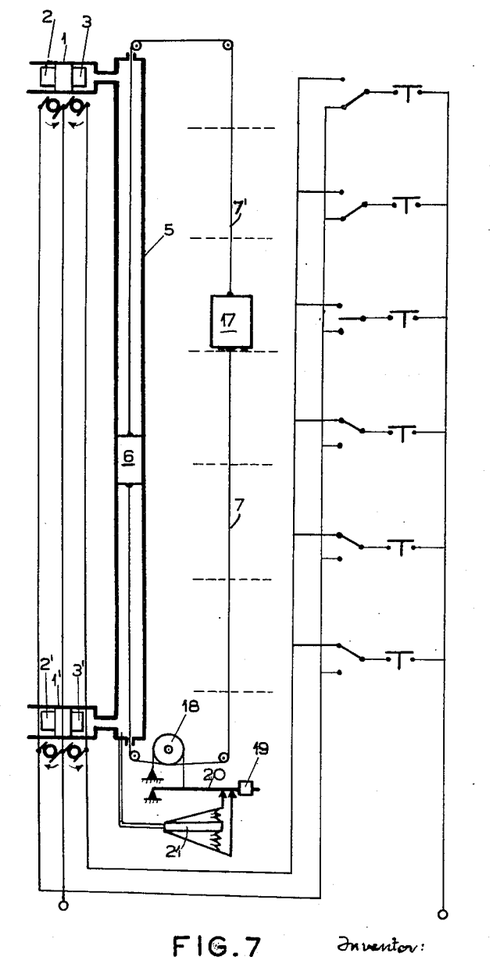
Figure 7 is a schematic view of a double-working device for a freight elevator.

In the freight elevator represented in Figure 7, the piston 6 is at the same time constructed as counter-weight of the cage 17 of the elevator. The cable connecting the same is guided along a brake-pulley 18, being fixed in its rest-position by the weight 19. The lever 20, to which said weight is fixed, is lifted, however, as soon as either pressure above or below atmospheric pressure exists in the bottom part of the cylinder 5.

Said bottom part is connected by means of a tube to the bellows 21, which are mounted in such a way that both sides can move freely, and that by means of rods attached to these sides the expansion as well as the contraction raises the lever 20 and consequently releases the brake-pulley 18.

The further elements corresponding with those in Figure 5 are indicated by the same reference numerals.

As soon as a pair of motors is started and consequently pressure either above or below atmospheric pressure is caused in the bottom part of the cylinder, either for descent or ascent of the elevator, the brake is released, owing to which the cage 17 can then yield to the movement of the piston (counter-weight) 6 and the cable 7—7'.

As soon as the cage has arrived at a floor the cage switches off the change-over switch, owing to which the motors come to a stop, the positive- or negative-pressure ceases, the pulley 18 is consequently braked once more, and the cage 17 therefore comes to a stop.

A signalling-device for calls to every floor as well as a position-indicating-device belong to its full equipment, but have not been indicated here more fully as not being in direct relation with the invention.

The application of a pair of bellows is only usable for small displacements; therefore in most cases a cylinder with a piston will be necessary as a reservoir of variable volume. With a view to airtightly sealing by the piston, the cylinder must be made and maintained with great care, which also holds for the cable-passages in the cylinder covers, when the mechanism has been made double-acting, such as is generally the case. It is clear that the cable-portions connecting the piston with the mechanism to be moved continually slide through the covers. A steel wire rope not having a perfectly smooth surface, but a twisted one, this presents some difficulty in obtaining air-tight sealing.

A special embodiment of the invention for larger constructions is possible, eliminating said drawbacks, even in large constructions, the cost of manufacture and maintenance besides being even lower.

This improved construction is characterized in that it consists of an air-chamber which is mounted similarly to a so-called wet gasometer in a gas-works, in such a way that it can be moved up and down, in a reservoir filled with a liquid (water), and which is connected by means of an air conduit to the housing 1 (Figure 1) in which is mounted the pair of pumps in such a way that this connection is maintained in any position of the air-chamber, without the liquid being able to penetrate into the conduit, whereas the chamber which may be given added weight is connected with the mechanism to be moved.

By putting the pressure pump into action, the chamber is lifted whereas, due to the action of the suction pump said chamber descends. Hence these movements are transmitted to the mechanism to be moved.

Figure 8:
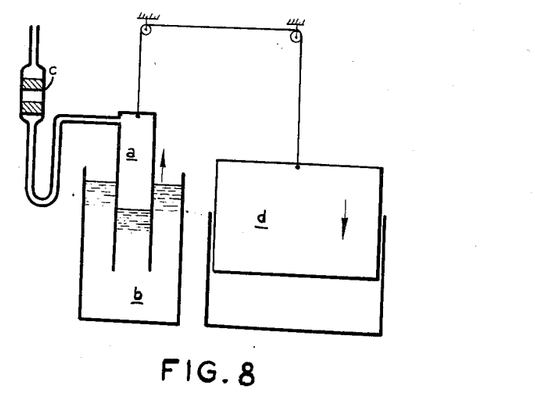
Figure 8 shows schematically the principle of another embodiment of the construction.

A construction in which the chamber would be made as heavy as the object to be lifted, and in which construction owing to the introduction of either pressure above or below atmospheric pressure into the chamber, the chamber would rise or descend, causing the door either to descend or to ascend. A suchlike construction is in principle represented by Figure 8. Therein $a$ is the air-chamber, immersing in the liquid $b$ and connected with the pump aggregate $c$, whereas $d$ is the door to be lifted. The liquid level shown indicates that the pressure pump is in operation, the chamber is rising and the door is descending.

In such a construction it should be taken into account that the maintenance of a pressure above atmospheric pressure in the chamber requires the latter to immerse sufficiently in the liquid, even in its highest position. With an overpressure of 0.1 of one atmosphere in the chamber, the depth of immersion will already be at least 1 m. In the lowest position of the chamber the pressure below atmosphere will also necessitate the ceiling of the chamber to remain at an equal distance above the liquid level in the reservoir, that no water being sucked up should come into the air duct entering near the ceiling, from which duct the air is then sucked away.

When for safety's sake both distances are set at 1.25 m., and the lifting height of the door for instance at 4 m., the chamber must already reach a height of 6.5 m., the reservoir a depth of at least 5.25 m., and above the water level there must at least be a rising height of 5.25 m., so that the whole construction becomes unpractically high. It will then be desirable to place the water reservoir below the ground level, which would, however, lead at once to increased cost of construction, when there is a high ground-water level.

Figure 9:
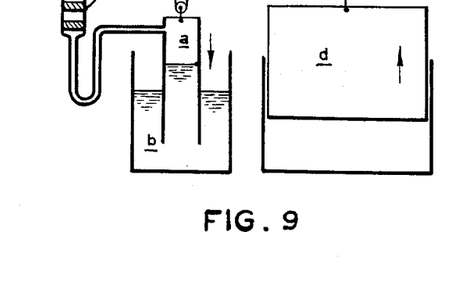
Figure 9 shows schematically an improvement thereof.

This disadvantage can be overcome by an improved construction represented in principle in Figure 9, by suspending the chamber on a pulley in such a way that the chamber only needs to cover half the distance of that of the object to be lifted. However, the weight of the chamber must now be double the weight of the load to be lifted. The liquid level in Figure 9 shows that the suction pump is in operation, the chamber descending and the door rising.

If the door has to be lifted along a height of 4 m., the chamber then only needs to move along a distance of 2 m., so that its length—provided the above data are otherwise unmodified—is reduced to 4.5 m. and the depth of the reservoir as well as the desired lifting height above the latter to 3.25 m.

However, suchlike mechanisms present the additional drawback that the water level in the reservoir shows great differences in height with regard to the suction of water into, or the forcing away of water from the chamber. Thus the reservoir must again have higher walls, which is undesirable.

This drawback can also be removed by making the mechanism double-acting, that is to say with two suchlike chambers, always moving in an opposite direction, so that the water which is forced away from one chamber is sucked into the other chamber, whereby the level in the reservoir always remains at an equal height.

It will not be necessary then to make each of the chambers as heavy as the load to be lifted, but only one counterweight will do, having the same weight as the load to be lifted, whereas each of the chambers only demands a weight equalling the force being necessary to give the load and counter-weight together the required acceleration. The above will be more fully explained by the construction according to Figures 10 and 11.

Figure 10:
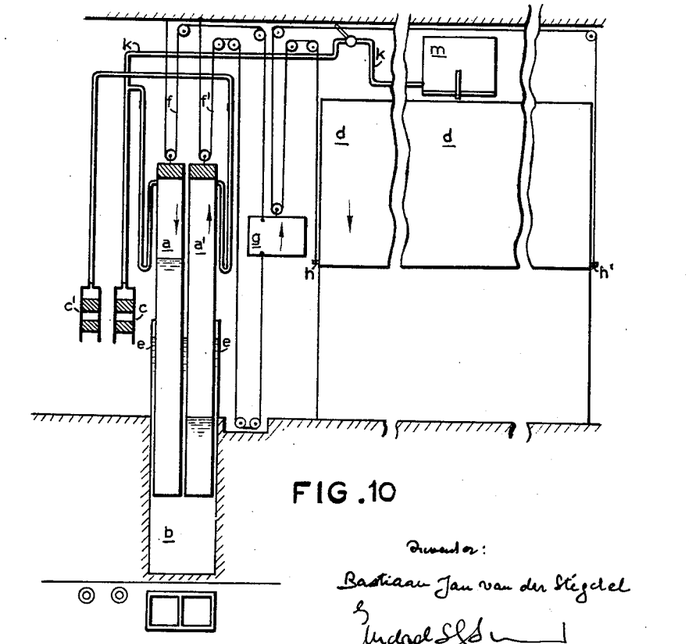
Figure 10 is a schematic view of the practical embodiment of that principle.
Figure 11:
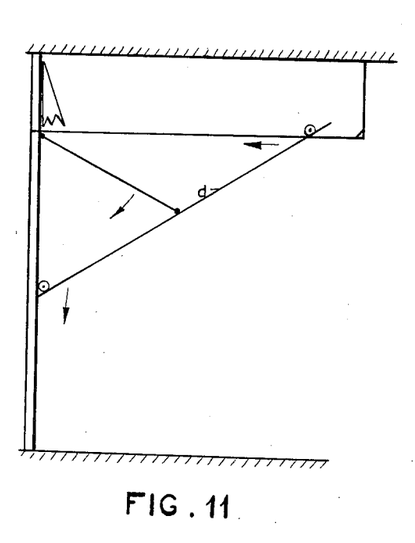
Figure 11 is a side-elevation of the embodiment of Fig. 10.

Therein $a$ and $a'$ represent the two chambers immersing in the liquid $b$, and connected with the pump aggregates $c$ and $c'$. The liquid level is constantly at $e$. The chambers are just half way, the left one is descending, the right one is rising. The cables $f$ and $f'$ are connected with one end to a fixed point, then run each over a pulley, being secured to each of the chambers, and are further connected, over the necessary guiding-rolls as represented in Figure 10, with points on opposite sides of the counter weight $g$. The latter also carries a pulley over which runs a cable, the ends of which are connected over some guiding-rolls with the lifting points $h$ and $h'$ of the overhead-door $d$.

From Figure 10 it immediately appears that the descent of the left chamber together with the rising of the right one causes the rising of the counter weight, hence the descent of the door and vice versa.

With regard to the weights of the various parts the following example may serve.

When the weight of the door is for instance 1000 kg., that weight will also be given to the counterweight $g$. It may be assumed that a force of 100 kg. will be sufficient to give the necessary acceleration to the complex of door and counterweight. As each chamber is suspended on a pulley the total force exerted by the weight of the descending chamber and the atmospheric pressure must amount to double the weight, hence to 200 kg. This can be obtained by giving each of the chambers a weight of 100 kg., whereas the second 100 kg. is supplied by the atmospheric pressure. When the difference in water level in and outside the chamber amounts to 1 m., hence 0.1 atmosphere or 0.1 kg. per cm.$^2$ an inner diameter of 1000 cm.$^2$ is already sufficient to supply the surplus of 100 kg. As the chambers can be given a square section, a side of 32 cm. will already be sufficient.

Furthermore $k$ indicates a duct for compressed air provided, in a similar way as earlier described at the start of the ascent of the door, for supplying compressed air to the bellows $m$ enabling the door to tilt.

In this mechanism without any packing means any possibility of leakage has been prevented.

The cost of manufacture and maintenance are considerably lower, as instead of metal materials such as cement, or asbestos-cement, so called eternite, may be used for the cylinders.

Thus this construction permits larger diameters of the chamber, which could not be obtained in metal cylinders with pistons without meeting great difficulties in making them airtight. Not only round sections, but chambers with rectangular or square sections may also be applied, whereby the entire surface of the water reservoir may be utilised. Thus with this hydraulic mechanism according to the invention greater power can be applied than with the mechanisms earlier described.

What I claim is:

1. An elastic fluid drive mechanism for executing movements in two opposite directions and thereby moving an external member, including the combination of a housing comprising bounding walls enclosing a chamber and having one end open to the atmosphere and the other end closed; two prime movers disposed serially spaced apart in the chamber within the housing; a pair of rotary multi-vaned air pump impellers individually and independently mounted on the prime movers in such fashion as to be directly driven thereby, said rotary multi-vaned air pump impellers together with said prime movers forming two independent air pumps mounted for alternative opposite operation to induce oppositely directed air currents in said chamber and each air pump being capable of providing and controlling the entire movement of air intended to pass through said chamber in response to the vacuum or pressure produced by the air pump involved; means for selectively impelling one or the other of said air pumps; stationary walls forming a reservoir for an elastic fluid; conduit means interconnecting the reservoir and said chamber through the closed end of said housing; a movable wall positioned within the stationary walls of said reservoir to form part of the latter; and an operative connection between said movable wall and said external member for moving the latter in one direction or the other in accordance with the movement executed by said movable wall.

2. An elastic fluid drive mechanism for executing movements in two opposite directions and thereby moving an external member, including the combination of a housing comprising bounding walls enclosing a chamber and having one end open to the atmosphere and the other end closed; two selectively operated electric motors disposed serially one behind the other and spaced apart in the chamber within the housing; a pair of rotary multi-vaned air pump impellers independently and individually mounted on the electric motors in such fashion as to be directly driven thereby and having the vanes on the two air pump impellers oriented in opposite directions, said rotary multi-vaned air pump impellers together with said electric motors forming two independent air pumps mounted for alternative opposite operation to induce oppositely directed air currents in said chamber and each air pump being capable of providing and controlling the entire movement of air intended to pass through said chamber in response to the vacuum or pressure produced by the air pump involved; stationary walls forming a reservoir for an elastic fluid; conduit means interconnecting the reservoir and said chamber through the closed end of said housing; a movable wall positioned within the stationary walls of said reservoir to form part of the latter; and an operative connection between said movable wall and said external member for moving the latter in one direction or the other in accordance with the movement executed by said movable wall.

3. An elastic fluid drive mechanism for executing movements in two opposite directions and thereby moving an external member, including the combination of a housing comprising bounding walls enclosing a chamber and having one end open to the atmosphere and the other end closed; two prime movers disposed serially spaced apart in the chamber within the housing; a pair of rotary multi-vaned air pump impellers individually and independently mounted on the prime movers in such fashion as to be directly driven thereby, said rotary multi-vaned air pump impellers together with said prime movers forming two independent air pumps mounted for alternative opposite operation to induce oppositely directed air currents in said chamber and each air pump being capable of providing and controlling the entire movement of air intended to pass through said chamber in response to the vacuum or pressure produced by the air pump involved; rigid walls forming a cylinder; a piston reciprocable in the cylinder and dividing the interior thereof into two variable compartments; conduit means interconnecting one of the compartments of said cylinder and the chamber in said housing through the closed end of the latter; and an operative connection between said piston and said external member for moving the latter member in one direction or the other in accordance with the movement executed by said piston.

4. An elastic fluid drive mechanism for executing movements in two opposite directions and thereby moving an external member, including the combination of a housing comprising bounding walls enclosing a chamber and having one end open to the atmosphere and the other end closed; two selectively operated electric motors disposed serially one behind the other and spaced apart in the chamber within the housing; a pair of rotary multi-vaned air pump impellers independently and individually mounted on the electric motors in such fashion as to be directly driven thereby and having the vanes on the two air pump impellers oriented in opposite directions, said rotary multi-vaned air pump impellers together with said electric motors forming two independent air pumps mounted for alternative opposite operation to induce oppositely directed air currents in said chamber and each air pump being capable of providing and controlling the entire movement of air intended to pass through said chamber in response to the vacuum or pressure produced by the air pump involved; means for selectively impelling one or the other of said air pumps; rigid walls forming a cylinder; a piston reciprocable in the cylinder and dividing the interior thereof into two variable compartments; conduit means interconnecting one of the compartments of said cylinder and the chamber in said housing through the closed end of the latter; and an operative connection between said piston and said external member for moving the latter member in one direction or the other in accordance with the movement executed by said piston.

5. An elastic fluid drive mechanism for executing movements in two opposite directions and thereby moving an external member, including the combination of a housing comprising bounding walls enclosing a chamber and having one end open to the atmosphere and the other end closed; two prime movers disposed serially spaced apart in the chamber within the housing; a pair of rotary multi-vaned air pump impellers individually and independently mounted on the prime movers in such fashion as to be directly driven thereby, said rotary multi-vaned air pump impellers together with said prime movers forming two independent air pumps mounted for alternative opposite operation to induce oppositely directed air currents in said chamber and each air pump being capable of providing and controlling the entire movement of air intended to pass through said chamber in response to the vacuum or pressure produced by the air pump involved; a bellows structure having at least one movable wall portion; conduit means interconnecting the interior of the bellows structure with the chamber in said housing through the closed end of the latter; and an operative connection between the movable wall portion of said bellows structure and said external member in order to move the latter member in one direction or the other according to the movement executed by said movable wall portion.

6. An elastic fluid drive mechanism for executing movements in two opposite directions and thereby moving an external member, including the combination of two housings each comprising bounding walls enclosing a chamber and having one end open to the atmosphere and the other end closed; two prime movers disposed serially spaced apart in the chamber within each housing; a pair of rotary multi-vaned air pump impellers individually and independently mounted on the prime movers in the chamber in each housing in such fashion as to be directly driven thereby, said rotary multi-vaned air pump impellers together with said prime movers forming two independent air pumps mounted in each chamber for alternative opposite operation to induce oppositely directed air currents in said chamber and each air pump being capable of providing and controlling the entire movement of air intended to pass through the chamber involved in response to the vacuum or pressure produced by the air pump concerned; means for selectively impelling one or the other of the air pumps in each of said chambers in said housings; rigid walls forming a cylinder; a piston reciprocable in the cylinder and dividing the interior thereof into two variable compartments; conduit means individually interconnecting each chamber in said housings through the closed ends thereof and the two compartments in said cylinder; and an operative connection between said piston and said external member for moving the latter member in one direction or the other in accordance with the movement executed by said piston.

7. An elastic fluid drive mechanism for executing movements in two opposite directions and thereby moving an external member, including the combination of two housings each comprising bounding walls enclosing a chamber and having one end open to the atmosphere and the other end closed; two prime movers disposed serially spaced apart in the chamber within each housing; a pair of rotary multi-vaned air pump impellers individually and independently mounted on the prime movers in the chamber in each housing in such fashion as to be directly driven thereby, said rotary multi-vaned air pump impellers together with said prime movers forming two independent air pumps mounted in each chamber for alternative opposite operation to induce oppositely directed air currents in said chamber and each air pump being capable of providing and controlling the entire movement of air intended to pass through the chamber involved in response to the vacuum or pressure produced by the air pump concerned; means for selectively impelling one or the other of the air pumps in each of said chambers in said housings; rigid walls forming a cylinder; a piston reciprocable in the cylinder and dividing the interior thereof into two variable compartments; conduit means individually interconnecting each chamber in said housings through the closed ends thereof and the two compartments in said cylinder; a counterweight; suspension means for operatively connecting the counter-weight with said exterior member so that movement of the latter and said counter-weight are interdependent; and cable connections extending lengthwise through said cylinder and connected between the opposite ends of said counter-weight and opposite portions of said piston whereby to move said external member in one direction or the other in accordance with the movement executed by said piston.

8. A pneumatic drive system according to claim 3, including a bellows structure having a movable wall portion; further conduit means interconnecting one of the compartments of said cylinder with the interior of said bellows structure; a mechanical connection between said movable wall portion of said bellows structure and said external member; and operable valve means connected to the further conduit means for opening and closing the latter conduit means in order to impose an additional movement on said external member during a controlled period of time.

9. A pneumatic drive system according to claim 7, including a bellows structure having a movable wall portion; further conduit means interconnecting one of the compartments of said cylinder with the interior of said bellows structure; a mechanical connection between said movable wall portion of said bellows structure and said external member; and valve means connected to the further conduit means operable on movement of the suspension means for opening and closing the latter conduit means in order to impose an additional movement on said external member during a controlled period of time.

10. A pneumatic drive system according to claim 7, including a bellows structure having two opposed movable wall portions; a conduit means interconnecting one of the compartments of said cylinder with the interior of said bellows structure; operable braking means for at least one of the cable connections of the counter-weight; lever means for moving said braking means into and out of effective operative and inoperative position; and mechanical connections between each of the movable wall portions of said bellows structure and said lever means whereby said braking means are moved into inoperative position upon movement of either of said movable wall portions.

11. An elastic fluid drive mechanism for executing movements in two opposite directions and thereby moving an external member, including the combination of a housing comprising bounding walls enclosing a chamber and having one end open to the atmosphere and the other end closed; two prime movers disposed serially spaced apart in the chamber within the housing; a pair of rotary multi-vaned air pump impellers individually and independently mounted on the prime movers in such fashion as to be directly driven thereby, said rotary multi-vaned air pump impellers together with said prime movers forming two independent air pumps mounted for alternative opposite operation to induce oppositely directed air currents in said chamber and each air pump being capable of providing and controlling the entire movement of air intended to pass through said chamber in response to the vacuum or pressure produced by the air pump involved; means for selectively impelling one or the other of said air pumps; a first liquid holding container having the surface thereof exposed to the atmosphere; a second container of smaller diameter than that of the first container and having a closed top and an open bottom; conduit means leading from the chamber in said housing through the closed end of the latter to the interior of the upper portion of said second container; and common suspension means for said external member and said second container movably supporting the latter partly immersed in liquid in said first container whereby said external member is moved in one or the other direction in accordance with the pressure exerted in said second container upon the liquid therein.

12. An elastic fluid drive mechanism for executing movements in two opposite directions and thereby moving an external member, including the combination of two housings each comprising bounding walls enclosing a chamber and having one end open to the atmosphere and the other end closed; two prime movers disposed serially spaced apart in the chamber within said housing; a pair of rotary multi-vaned air pump impellers individually and independently mounted on the prime movers in the chamber in each housing in such fashion as to be directly driven thereby, said rotary multi-vaned air pump impellers together with said prime movers forming two independent air pumps mounted in each chamber for alternative opposite operation to induce oppositely directed air currents in said chamber and each air pump being capable of providing and controlling the entire movement of air intended to pass through the chamber involved in response to the vacuum or pressure produced by the air pump concerned; means for selectively impelling one or the other of the air pumps in each of said chambers in said housings; a first liquid holding container having the surface thereof exposed to the atmosphere; a pair of further containers of an aggregate diameter less than that of the first container and having closed tops and open bottoms; conduit means interconnecting the interiors of the upper portions of the further containers and the chambers in said housings through the closed ends thereof; a counterweight; suspension means for operatively connecting the counter-weight and said external member so that movements of the latter and said counter-weight are interdependent; cable connections for connecting said further containers with opposite portions of said counter-weight; and support means for said cable connections, the support means and cable means effecting suspension of said further containers partly immersed in liquid in said first container whereby said external member is moved in one or the other direction in accordance with the pressure or suction exerted in the one or the other of said further containers upon the liquid therein in communication with the liquid in said first container.

BASTIAAN JAN van der STIGCHEL.

REFERENCES CITED

The following references are of record in the file of this patent:

UNITED STATES PATENTS

| Number | Name | Date |
| --- | --- | --- |
| 442,756 | Mills | Dec. 16, 1890 |
| 547,661 | Cawhern | Oct. 8, 1895 |
| 1,034,863 | Behr | Aug. 6, 1912 |
| 1,342,682 | Knowlton | June 8, 1920 |
| 1,560,705 | Mayer | Nov. 10, 1925 |
| 1,756,910 | Fuller | Apr. 29, 1930 |
| 1,902,063 | Ferris et al. | Mar. 21, 1933 |
| 2,141,703 | Bays | Dec. 27, 1938 |